July 11, 1950          J. B. COOK          2,514,474
METHOD OF MAKING C-SHAPED CLAMPS
Filed April 30, 1945          2 Sheets-Sheet 1
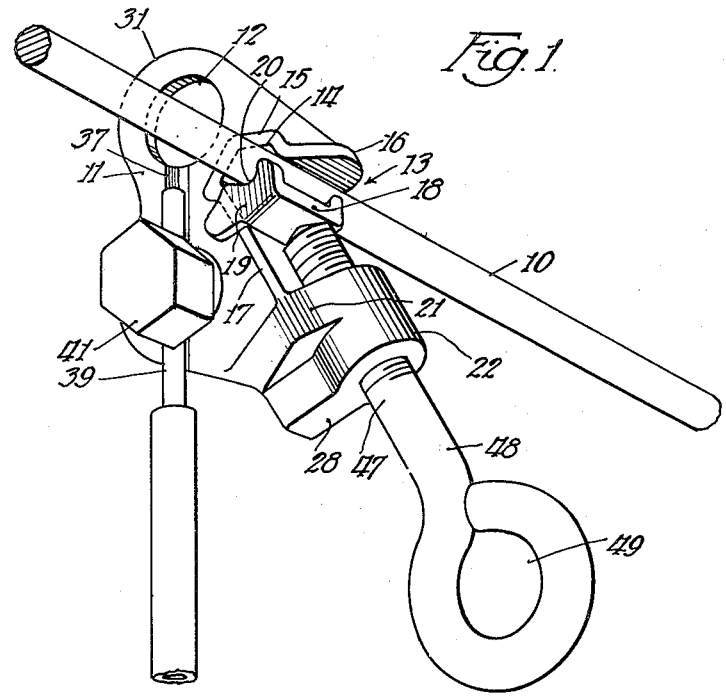
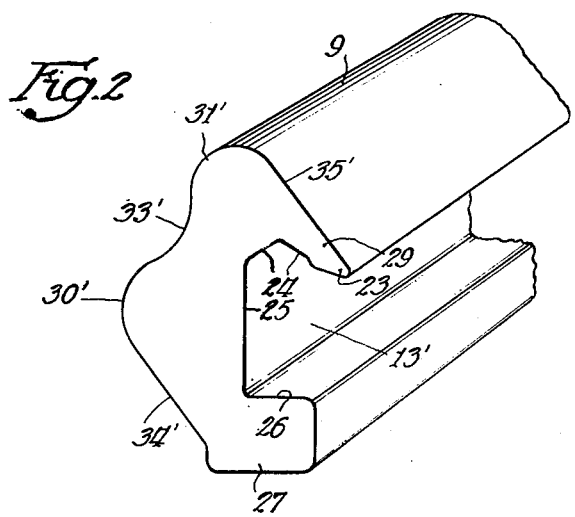
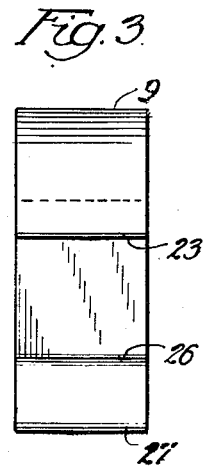
Inventor.
John Brown Cook
By: Zabel and Gritzbaugh
Attys.

July 11, 1950  J. B. COOK  2,514,474
METHOD OF MAKING C-SHAPED CLAMPS
Filed April 30, 1945  2 Sheets-Sheet 2

Inventor
John Brown Cook
By Zabel and Gritzbaugh
Attys

Patented July 11, 1950

2,514,474

UNITED STATES PATENT OFFICE 2,514,474

METHOD OF MAKING C-SHAPED CLAMPS

John Brown Cook, Chicago, Ill., assignor to Reliable Electric Company, Chicago, Ill., a corporation of Illinois Application April 30, 1945, Serial No. 591,174

2 Claims. (Cl. 29—155.5)

My invention relates to electrical clamps, and more particularly to a hot line clamp for connecting a tap with a live conductor.

Clamps of the character of my invention are hooked onto an energized line and are ordinarily held on the end of a wood stick in order to be connected with and disconnected from the line, said stick and said clamp having cooperating formations thereon for holding the clamp so that it can be placed in position and removed from its position on the line. Also such clamps must be provided with means such that these can be disconnected from an energized line by a lineman who is not equipped with live line tools, such as above referred to. In such case a hook end on a standard disconnect tool must be capable of being connected with an eye in the clamping screw for unclamping the clamp from the line and thereafter said hook must be engaged with an eye or loop on the clamp so as to lift the clamp off the line wire.

It is a purpose of my invention to provide a clamp of the general character above referred to, which is light in weight and strong. These clamps have previously been cast out of various types of alloys, such as bronzes, which are relatively costly, and such castings are porous and of low tensile strength considering the weight thereof. By cold forging a clamp of this character, I have provided a clamp that can be made of a lighter construction, and due to the very close grain resulting from the forging operation, said clamp is much higher in tensile strength than the cast clamps used prior to my invention.

Hot forging from various types of alloys suitable for a conducting member of this character is not feasible, because the cost thereof is increased greatly over casting, whereas by my method the cost is less than that of a cast clamp of the same general character and at the same time a stronger and lighter article results. The weight of the clamp is of great importance, because the weight of the conventional clamp causes fatigue of the line wires at the point of contact after a relatively short period of use, due to the weight thereof and the vibrations set up at this point. By providing a clamp of considerably less weight the possibility of breakage of line wires due to fatigue is reduced to a fraction of that existing with the heavier cast clamps, or the period of use of such a clamp at a given location without danger of breakage of the line wire is increased more than three times over that possible with a cast clamp, such as ordinarily used.

The body portion of a clamp of this character is relatively thin and flat, but has thicker portions to provide guiding means for the movable jaw of the line wire clamp and to provide a wide fixed jaw for the clamp, which has a wide bearing on the line wire, and furthermore to provide a mounting for the clamping screw and to provide a projecting nose or lip on the clamp at the entrance opening to the jaws so as to enable a lineman to slam the clamp onto the line very quickly to minimize arcing and consequent damage to the line wire. In order to cold forge an article of the shape above referred to, by a single pressing or squeezing operation, it is necessary to follow the procedure referred to below.

My improved method comprises the extrusion of a barlike member having a cross sectional shape that approximates in a general way the shape of the clamp in a plane parallel to one of the flat faces of the relatively thin body portion thereof, the cutting of a blank of the required width from such an extruded bar and then pressing or forging the blank by a cold method between a pair of dies in a single pressing or squeezing operation to cause the metal of the blank to flow principally parallel to the aforementioned plane to form the final shape of the clamp body including the various thickened and flanged portions thereon.

Other objects and advantages of my invention will appear as the description of the drawings proceeds. I desire to have it understood, however, that I do not intend to limit myself to the particular details shown or described, except as defined in the claims.

In the drawings:

Fig. 1 is a perspective view showing my improved clamp applied to a hot line wire, showing a fragmentary portion of the conductor constituting the tap extending therefrom.

Fig. 2 is a fragmentary perspective view of the extruded bar or shape from which the blanks for cold forging my hot line connector clamp body are cut.

Fig. 3 is an end elevational view of the cut blank.

Figure 6:
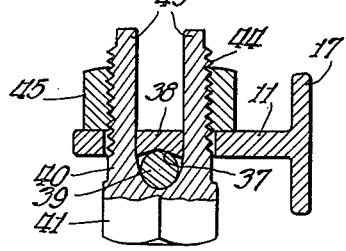
Fig. 6 is a section taken on the line 6—6 of Fig. 4.

Referring in detail to the drawings, in Fig. 1 is shown a clamp made in accordance with my invention applied to a hot wire 10, said clamp having a flat body portion 11, which has a large opening 12 therein so as to form a loop or eye of a portion of said main body portion 11 for receiving the hook of a disconnect tool for lifting the clamp off the wire 10. Said clamp has an opening or recess 13 in one side of the body portion 11, which is shaped so as to provide a pair of angularly related clamping faces 14 in the margin of said recess or opening for engagement with the line wire 10, the body portion of the clamp being provided with wide laterally projecting flanges 15, thus providing a fixed clamping jaw that is much wider than the thickness of the body portion 11, thus providing a wide bearing surface for the fixed jaw of the clamp on the line wire 10. Extending forwardly from the body portion 11 at one side of the entrance to the recess 13 is a nose or lip 16, which is rounded as shown in the drawings and extends at an oblique angle, serving as means to guide the clamp into position on the wire 10, guiding the fixed jaw into proper engagement with said wire so that the clamp will be hooked over the wire to permit the movable jaw, to be described below, to be moved into engagement with the wire to clamp said wire between said movable and fixed jaws.

Said clamp body is further provided with a pair of guide flanges 17 of substantially the width of the flanges 15 for guiding the movable jaw member 18 of the clamp, which movable jaw is provided with a pair of flanges 19 that have curved recesses 20 therein that provide socket portions that are adapted to engage the wire 10 in a similar manner to the inclined faces 14 of the fixed jaw of the clamp. The flanges 15 and 17 and the nose 16 border the recess 13, and a thickened reinforcing portion 21 connecting the boss 22 with the body of the clamp completes a thickened portion bordering said recess 13 on all sides thereof.

The above referred to structure is necessary in order to get the desired wide bearing of the clamp on the conductor 10 and to obtain the required strength for the clamping portion of the clamp. However, due to the fact that a relatively thin body portion of considerable area and a relatively much thicker portion surrounding the recess 13 comprises the clamp body, it is necessary to make this clamp body in the particular manner to be described, in order that the same can be cold forged by a single forging operation.

In order to accomplish the shaping or forming of a clamp body of the above referred to general character by cold forging, it has been found necessary to provide a blank that is close enough to the final shape of the clamp body that a minimum flow of material is necessary in order to form the various portions thereof. To obtain such a blank I extrude a bar of an alloy that can be readily cold forged, such as the copper-silicon alloy sold by the American Brass Company under the name "Everdur", which bar or shape is of a generally channel shaped character, although somewhat modified from a true channel shape and having certain ribs or protuberances thereon, so that the cross section thereof is generally of the shape of a section through the clamp body taken parallel to one of the flat faces thereof. From this extruded bar a length is cut off that is of the proper width to form the body portion of the clamp. Said blank is considerably thicker than the thickness of the flat body portion of the clamp, and approximately the thickness of the width of the flanged portions 15 and 17 thereof.

A fragmentary portion of such an extruded bar is shown in Fig. 2. Said bar 9 has a recess or channel 13' therein corresponding in cross sectional shape generally to the recess 13, in that it has an inclined lip portion 23, which corresponds substantially to the nose portion 16 of the clamp body, inclined faces 24 extending at an oblique angle to each other corresponding substantially to the faces 14 in the finished clamp, and a wall 25 extending perpendicularly to the wall 26, which walls correspond to the flanged portions 17 at the end of the boss 22. The cross sectional shape of said extruded blank furthermore has a relatively thick bulky rectangular leg 27 providing the material for forming the boss 22 and the reinforcement 21, as well as the rib 28 extending laterally from the boss 22, said leg being thick in comparison with the thinner inclined leg 29, which corresponds in shape generally to the nose, the fixed jaw, and the forward upper end of the flat body portion 11.

Figure 4:
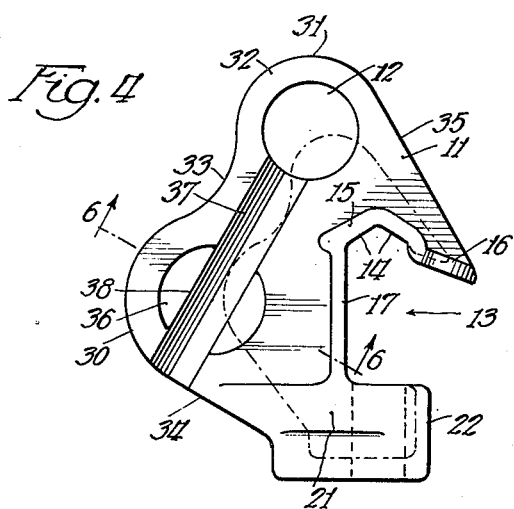
Fig. 4 is a side elevational view of the completed clamp body.
Figure 7:
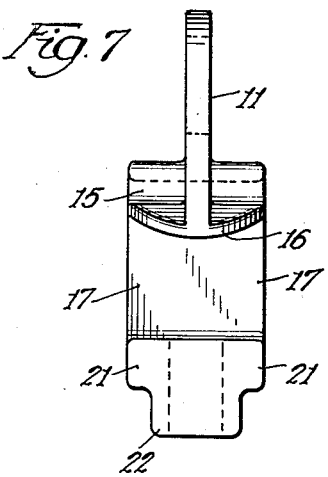
Fig. 7 is an end elevation thereof.
Figure 5:
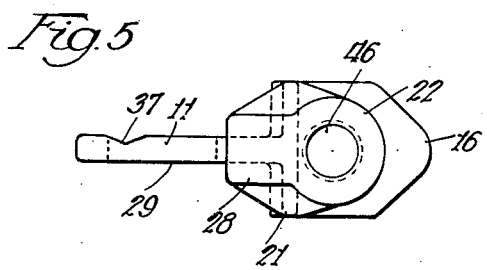
Fig. 5 is a bottom plan view thereof.

Referring to Fig. 4 it will be noted that the body portion 11 is provided with an inwardly curved portion 33 in the rear edge thereof, thus providing convexly curved edge portions on the clamp body at 30 and 31, the material between the edge 31 and the opening 12 providing the loop 32 for engagement of the disconnecting tool hook to lift the clamp off the wire 10 when this is desired.

The extruded bar 9 makes provision for this outline of the clamp body by providing a pair of curved rib portions 30' and 31' corresponding to the convexly curved edge portions 30 and 31 of the body portion 11, between which said bar is provided with a concavely curved groove 33' corresponding to the inwardly curved edge portion 33. It will also be noted that the extruded bar has an inclined outer wall 34' corresponding generally to the inclined edge 34 of the clamp body and an inclined wall 35' corresponding generally to the inclined edge 35 of the clamp body.

The cross section of the extruded bar thus follows approximately the shape of the finished clamp body, but is, except for the width of the channel 13', of lesser dimensions in transverse section than the finished clamp body in the plane parallel to one of its flat side faces.

In order to obtain a blank for cold forging the clamp body a length of the extruded bar 9 is cut off to form a thick blank that is considerably thicker than the flat thin portion 11 of the clamp body, but approximately as thick as the width of the flange 17 and jaw 15.

The blank is then pressed or squeezed between dies of such shape as to form the body portion of the clamp by means of one or more pressing or squeezing operations, said blank assuming, after being thus cold forged, the shape shown in Fig. 4, except for the openings 12 and 36 therein, a V-shaped groove 37 being formed in said clamp body during said cold forging operation.

After this pressing or cold forging operation has been completed, the clamp body thus formed is perforated so as to form the openings 12 and 36, the opening 12 being a large circular opening, and the opening 36 being partly circular, leaving a web or cross bar 38 integral with the body portion of the clamp between said two openings 36, which web or cross bar aligns with the groove 37 and has said groove 37 running lengthwise across the same.

It will be noted that the openings 36 are provided with curved edges that lie on the same circle and with straight edges at the web portion 38. The openings 36 and the cross bar or web portion 38 serve as means for connecting the tap wire or conductor 39 to the clamp body, this being accomplished by providing a split bolt-like member 40, which, preferably, has a hexagonal head 41 and a pair of parallel shank portions 43, which are also partly circular in cross section, corresponding to the shape of the openings 36 in their cross sectional shape and being threaded at 44 to receive a nut 45, said nut clamping the conductor 39 between the portion of the bolt-like member 40 connecting the bifurcated or split shank portions 43 and the web or cross bar 38, the conductor 39 seating in the V-shaped groove 37.

The boss 22 is provided with a screw-threaded opening 46 therein, which screw-threadedly receives the screw-threaded shank 47 of the clamping screw 48, which engages the jaw 18 to move it into clamping engagement with the conductor 10, a loop or eye 49 being formed on the end of said clamping screw for engagement of the hook of a disconnecting tool or a live line tool therewith. The rib 28 is provided for engagement with a formation on the live line tool for mounting the hot line clamp thereon when either placing the same in position on the line wire 10 or removing the same therefrom.

The screw 47 is rotatably connected to the jaw 18 to prevent longitudinal separation as well understood, thus to maintain proper alinement of said jaw.

What I claim is:

1. The method of making a generally C-shaped clamp member the body portion of which comprises a web portion having a C-shaped opening at one side thereof and in which the material adjacent said opening has a thickness substantially greater than the thickness of said web portion to provide a flange bordering said opening, said method comprising the steps of extruding a bar of metal having a generally C-shaped opening which corresponds generally in cross sectional area to the opening of said finished clamp member, said bar having a cross sectional area which is substantially less than the cross sectional area of said finished clamp member, cutting a blank from said extruded bar, which blank has a thickness corresponding substantially to the thickness of said flange, cold forging said blank to final shape by one or more localized pressing operations in which the pressure is applied to the side surfaces of said blank at points spaced outwardly from the edge of said opening to reduce the thickness of said blank and to enlarge its cross section by causing the material of said blank to flow in an outward direction away from said opening thereby providing a flanged article having a thin substantially flat web of high tensile strength extending outwardly from the flange bordering said opening and having a cross sectional area substantially greater than the cross sectional area of said extruded bar.

2. The method of making a generally C-shaped clamp member the body portion of which comprises a web portion having a C-shaped opening at one side thereof and in which the material adjacent said opening has a thickness substantially greater than the thickness of said web portion to provide a flange bordering said opening, said flange in turn providing a fixed jaw, a mounting for a clamping screw, and a guide for a cooperating clamping jaw, said method comprising the steps of extruding a bar of metal having a generally C-shaped opening which corresponds generally in cross sectional area to the opening of said finished clamp member, said bar having a cross sectional area which is substantially less than the cross sectional area of said finished clamp member, cutting a blank from said extruded bar, which blank has a thickness corresponding substantially to the thickness of said flange, cold forging said blank to final shape by one or more localized pressing operations in which the pressure is applied to the side surfaces of said blank at points spaced outwardly from the edge of said opening to reduce the thickness of said blank and to enlarge its cross section by causing the material of said blank to flow in an outward direction away from said recess to provide a thin substantially flat web of high tensile strength and having a cross sectional area substantially greater than the cross sectional area of said extruded bar, perforating said web to provide openings therethrough, and providing a screw threaded opening through said flange for mounting a clamping screw.

JOHN BROWN COOK.

REFERENCES CITED

The following references are of record in the file of this patent:

UNITED STATES PATENTS

| Number | Name | Date |
|---|---|---|
| 1,603,035 | Evans | Oct. 12, 1926 |
| 1,712,067 | Bodendieck et al. | May 7, 1929 |
| 1,734,008 | Frehse | Oct. 29, 1929 |
| 1,900,990 | Johnson | Mar. 14, 1933 |
| 1,993,391 | Weaver | Mar. 5, 1935 |
| 2,025,321 | Walsh | Dec. 24, 1935 |
| 2,107,061 | Pittman et al. | Feb. 1, 1938 |
| 2,151,524 | Pittman et al. | Mar. 21, 1939 |
| 2,239,331 | Mebold | Apr. 22, 1941 |
| 2,309,666 | Parker | Feb. 2, 1943 |